US007729321B2

(12) United States Patent
Liu

(10) Patent No.: US 7,729,321 B2
(45) Date of Patent: Jun. 1, 2010

(54) NEARLY COLLISION-FREE CHANNEL ACCESS SYSTEM AND METHOD

(75) Inventor: Yu-Jih Liu, Ledgewood, NJ (US)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 520 days.

(21) Appl. No.: 11/677,313

(22) Filed: Feb. 21, 2007

(65) Prior Publication Data

US 2008/0198815 A1  Aug. 21, 2008

(51) Int. Cl.
H04B 7/212 (2006.01)
H04J 3/00 (2006.01)
H04L 12/43 (2006.01)

(52) U.S. Cl. ................. 370/337; 370/347; 370/442; 370/458

(58) Field of Classification Search ............. 370/321, 370/329, 336, 337, 343, 347, 431, 442, 445, 370/458, 461, 462
See application file for complete search history.

(56) References Cited

U.S. PATENT DOCUMENTS

| | | | | |
|---|---|---|---|---|
| 5,422,887 | A * | 6/1995 | Diepstraten et al. | 370/448 |
| 5,509,015 | A * | 4/1996 | Tiedemann et al. | 370/311 |
| 5,884,196 | A * | 3/1999 | Lekven et al. | 455/574 |
| 5,909,651 | A * | 6/1999 | Chander et al. | 455/466 |
| 6,088,344 | A * | 7/2000 | Wales et al. | 370/329 |
| 6,418,136 | B1 * | 7/2002 | Naor et al. | 370/347 |
| 6,532,224 | B1 * | 3/2003 | Dailey | 370/337 |
| 7,215,681 | B2 * | 5/2007 | Li | 370/445 |
| 2002/0067736 | A1 * | 6/2002 | Garcia-Luna-Aceves et al. | 370/442 |
| 2002/0136180 | A1 * | 9/2002 | Asokan | 370/337 |
| 2003/0067936 | A1 * | 4/2003 | Amtmann | 370/437 |

(Continued)

OTHER PUBLICATIONS

Chenxi Zhu et al. "A Five-Phase Reservation Protocol (FPRP) for Mobile Ad Hoc Networks". IEEE 1998.

(Continued)

*Primary Examiner*—Nittaya Juntima
*Assistant Examiner*—Xavier Szewai Wong
(74) *Attorney, Agent, or Firm*—Edell, Shapiro & Finnan, LLC

(57) ABSTRACT

Techniques for controlling access to a communication channel for each of a plurality of nodes in a wireless ad hoc communication network. According to one embodiment, each node uses a predetermined rule, such as a hash function, to compute which of a plurality of time slots during a contention window it is to attempt transmissions. Each node in the network follows the same rule to access the channel and as a result no additional overhead transmissions are required between the nodes. In addition, contention among different nodes is reduced when a node needs to repeat an attempt to make a transmission. When a node has data to transmit on the channel, it determines a time slot in the contention window period during which to attempt the transmission using a computation that is based on a number identifier assigned to the node, the number of time slots in the contention window period and a transmission count value that represents the number of attempts the node has made to make the transmission. According to another embodiment, nodes are assigned to slot groups based on the time slot computation and the groups are assigned to particular slots during successive blocks in a round robin fashion so as to ensure fair access to the communication channel.

20 Claims, 6 Drawing Sheets

U.S. PATENT DOCUMENTS

| | | | |
|---|---|---|---|
| 2003/0137993 A1* | 7/2003 | Odman | 370/468 |
| 2005/0238042 A1* | 10/2005 | Hong | 370/442 |
| 2006/0198346 A1* | 9/2006 | Liu et al. | 370/338 |
| 2007/0058660 A1* | 3/2007 | Sammour et al. | 370/445 |
| 2007/0064720 A1* | 3/2007 | Sterenson et al. | 370/445 |
| 2007/0155398 A1* | 7/2007 | Park et al. | 455/453 |
| 2008/0132264 A1* | 6/2008 | Krishnamurthy et al. | 455/522 |
| 2008/0151820 A1* | 6/2008 | Solis et al. | 370/329 |

OTHER PUBLICATIONS

Ji-Her Ju et al. "TDMA Scheduling Design of Multihop Packet Radio Networks Based on Latin Squares". IEEE Journal on Selected Areas in Communications, vol. 17, No. 8, Aug. 1999.

Lichun Bao et al. "Hybrid Channel Access Scheduling in Ad Hoc Networks". IEEE 2002.

Long Yang et al. "Node Activation with Polling Channel Access". IEEE Communications Society, 2004.

Jerzy Konorski et al. "Application of a Hash Function to Discourage MAC-Layer Misbehaviour in Wireless LANs". Journal of Telecommunications and Information Technology, Feb. 2004.

Imrich Chlamtac et al. "Time-Spread Multiple-Access (TSMA) Protocols for Multihop Mobile Radio Networks". IEEE/ACM Transactions on Networking, vol. 5, No. 6, December 1997.

* cited by examiner

NEARLY COLLISION-FREE CHANNEL ACCESS SYSTEM AND METHOD

BACKGROUND OF THE INVENTION

The present invention is directed to ad-hoc wireless communication networks in which devices that are nodes on the wireless network compete for access to the frequency channel in order to communicate with each other.

One well known technique for controlling how devices access a shared channel is called ALOHA. In the ALOHA scheme, every node transmits as long as it has data available to transmit. If a collision is detected, the source node backs off and retransmits again after a timeout interval. An improvement to ALOHA is the so-called "slotted" ALOHA in which the transmitting node can only transmit within a slot boundary. However, collision probability is still high and unavoidable using the ALOHA schemes.

There are two other well known channel access protocols: Carrier Sense Multiple Access (CSMA) and Time Division Multiple Access (TDMA). The TDMA scheme is mainly used for transmission that has certain requirements that must be met to maintain reliability and minimal delay for signals carrying voice and video in which latency is an issue. The CSMA technique is mainly used for data transmissions where latency is not necessarily a concern.

Carrier Sense Multiple Access with Collision Detection (CSMA/CD) is a scheme in which the source node listens to the channel first to determine if the channel is free before it transmits. If the node determines that the channel is free, it transmits its data packet. The packet received by the intended recipient node is transmitted back to the source node where it is compared with the original packet. If the source node determines that the received packet does not match the transmitted packet, then it declares that a collision occurred and the source node backs off for a period of time and retransmits the packet.

An improvement to CSMA/CD is Carrier Sense Multiple Access with Collision Avoidance (CSMA/CA). In this scheme, the source node transmits when the channel is free. If the channel is not free, the source node waits until the end of a transmission on the channel and then waits again for a random period of time that is uniformly distributed between 0 and the duration of the time period during which nodes contend for access to the channel, known as the "contention window". At the expiration of the contention window, the source node monitors activity on the channel again. If the source node determines that the channel is free, it transmits the packet. If the source node determines that the channel is not free, then the process repeats. A disadvantage of the CSMA/CS technique is that there is no guarantee that collisions will be avoided, particularly when there is a "hidden" node on the network.

Still another channel access scheme is called Distributed Foundation Wireless Medium Access Control (DFWMAC-IEEE 802.11). The IEEE 802.11 communication protocol is an industry standard that is based upon CSMA/CA but with the addition of handshaking control signals between the source node and destination node. The purpose of the handshaking protocol is to solve the hidden node problem. In this scheme, a source node wishing to transmit data first sends a Request to Send (RTS) message to the intended recipient or destination node. If the intended recipient node is ready to receive the data from the source node it responds with Clear to Send (CTS) message transmitted to the source node. Upon receiving a CTS message, the source node transmits the data packet to the intended recipient node. If the recipient node receives the data packet correctly, the recipient node transmits an acknowledgment (ACK) message to the source node so that the source node knows the transmission was successful. The exchange of RTS and CTS messages avoid the prolonged collisions since RTS and CTS messages are short control packets. In addition, the RTS/CTS/ACK scheme solves the hidden node problem because a source node only transmits when the recipient has indicated it is ready to receive. All other nodes that are not involved in the communication session between the source node and recipient node will listen and detect the RTS/CTS/ACK message exchange and know to back off the channel thereby avoiding the hidden node problem. If the source node does not receive an ACK from the recipient node, it doubles the duration of the contention window for the retransmission until a retransmission counter reaches a maximum value. The contention window is reset upon every successful transmission or when the retransmission counter has reached a maximum value.

There are also variations of the channel access control schemes of the IEEE 802.11 standard. One is the Five-Phase Reservation Protocol (FPRP) designed for scheduling broadcast messages. The FPRP uses synchronous timing operations and provides for additional control packet exchanges. Still another variation is to have separate control packets during both the signal period and data period for both unicast and broadcast messages. During the signaling period, data slots are reserved by the source node. However, immediately before the data period, additional packets are sent from the recipient node to confirm the reservation to the source node.

There are also some collision free protocols which are topology independent. For example, the utilization of Latin Squares and Time Spread Multiple Access (TSMA) codes produced from polynomials over Galois fields are used for slot and channel assignments. Utilizing these assigned slots, nodes can access the channel without colliding with transmission from other nodes.

Recently, channel access techniques have been developed that are known as Neighbor-Aware Contention Resolution (NCR) protocols such as Node Activation Multiple Access (NAMA) and Hybrid Activation Multiple Access (HAMA). These types of protocols assign a priority to each node or link based upon a hash function. The node or link with the highest priority among its two-hop neighbors can access the channel.

Even though the channel access schemes of the IEEE 802.11 standard helps solve the hidden node problem, it does not eliminate collisions because it is still a CSMA/CA scheme. For example, if multiple nodes have the same transmission time and happen to select the same random back-off time when the channel is not busy, their transmission will collide.

The collisions issue becomes more serious when the amount of traffic on the network increases. Heavy traffic increases the probability of at least two nodes trying to access the channel at the same time. Likewise, as the number of nodes on the network increases the probability of collisions also increases because more nodes are trying to access the channel.

The FPRP is not collision free and has other problems such as the "exposed terminal" problem. FPRP also does not work well with changing network topology. The collision-free protocols such as the Latin Squares and TSMA codes only work for small networks, and also require the maximum number of nodes and maximum degree of nodes in order to guarantee successful packet transmissions.

For NCR protocols, channels may be underutilized if a winning node has no packet to send. Access delays could also increase if a losing node has to wait to send a packet. In addition, the hash function used in the NCR protocols is based upon a pseudo-random number generator and is computationally expensive to implement in a device.

SUMMARY OF THE INVENTION

Briefly, the present invention is directed to controlling access to a communication channel for each of a plurality of nodes in a wireless ad hoc communication network. According to one embodiment, each node uses a predetermined rule, such as a hash function, to compute which of a plurality of time slots during a contention window it is to attempt transmissions. Each node in the network follows the same rule to access the channel and as a result no additional overhead transmissions are required between the nodes. In addition, contention among different nodes is reduced when a node needs to repeat an attempt to make a transmission. When a node has data to transmit on the channel, it determines a time slot in the contention window period during which to attempt the transmission using a computation that is based on a number identifier assigned to the node, the number of time slots in the contention window period and a transmission count value that represents the number of attempts the node has made to make the transmission. Under most conditions, this scheme leads to collision-free transmissions.

According to another embodiment, a technique is provided to ensure fairness across the nodes in accessing the channel. In particular, a round robin slot assignment technique is provided to ensure that no node has higher priority than other nodes in access the channel. The plurality of nodes contend for access to the communication channel over a period of time that is divided into a sequence of successive blocks. Each block comprises a sequence of contention time period and each contention time period comprises a plurality of time slots. When a node has data to transmit, it first determines which one of a plurality of slot groups it is assigned to based on a number identifier assigned to the node, the number of slots in a contention window period, and a transmission count value R that indicates how many attempts the node has made to transmit the data. Nodes in each slot group access the channel at a corresponding one of the K time slots. Next, the node determines during which of the K time slots the node may access the channel during each contention time period in the sequence of contention time periods during a block of time slots according to a group assignment sequence that changes from one block of time slots to the next block of time slots. For example, the group assignment sequence may rotate one slot group from one block to the next and repeats after a predetermined number of blocks.

DETAILED DESCRIPTION

Figure 1:
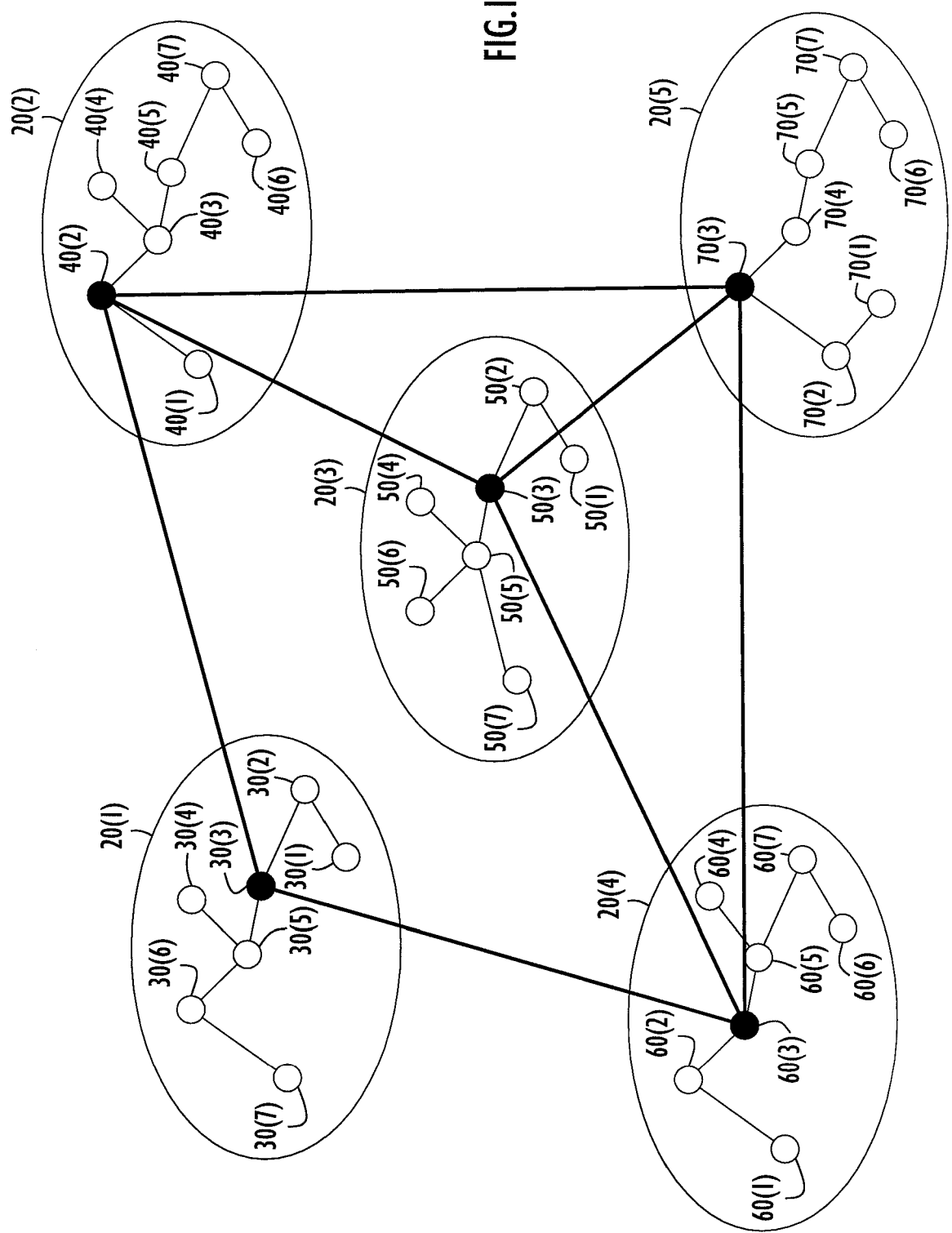
FIG. 1 is a block diagram of a conventional wireless ad-hoc communication network.

Reference is made first to FIG. 1 in which a conventional wireless ad-hoc communication network is shown at 10. The network 10 is organized into first and second tiers. The first tier comprises a plurality of so-called "islands" 20(1) to 20(5). Each node joins an island and each island has a so-called "island head" indicated by the darker shaded node in an island. For example, island 20(1) comprises a plurality of nodes 30(1) to 30(7), and node 30(3) is the island head for island 20(1). Similarly, island 20(2) comprises nodes 40(1) to 40(7), and 40(2) is the island head. Island 20(3) comprises nodes 50(1) to 50(7) and node 50(3) is the island head. Island 20(4) comprises nodes 60(1) to 60(7) and node 60(3) is the island head. Island 20(5) comprises nodes 70(1) to 70(7) and node 70(3) is the island head. Those nodes affiliated with an island head are also called "island members". Within an island there is a flat network architecture comprised of multiple hops.

The island heads of each island form the second tier of the network 10. The second tier is also an island that has an island head. In FIG. 1, the dark lines represent the second-tier links between the island head nodes 30(3), 40(2), 50(3), 60(3) and 70(3). For simplicity, the second-tier island head is not specifically indicated but it should be understood that any one of the island head nodes may serve as the second tier island head. When a node communicates with other nodes in the first tier, it uses a different carrier frequency than when a node communicates with other nodes in the second tier.

In operation, when node 30(6) in island 20(1) wants to communicate with node 40(4) in island 20(2), node 30(6) first sends a transmission to the island head node 30(3) in island 20(1). The island head node 30(3) in island 20(1) then sends the transmission to the island head node 40(2) in island 20(2) through the second tier island. The island head node 40(2) in island 20(2) then sends the transmission to node 40(4) in island 20(2).

Collisions between transmissions from two or more nodes occur because of the high probability of multiple nodes trying to access the same frequency channel. One solution is to provide a collision free communication protocol so that each node is assigned a different slot. This scheme works when there only a few nodes in the network. When the number of nodes is large, the throughput decreases because the probability of each node getting a turn to access the channel decreases.

Figure 2:
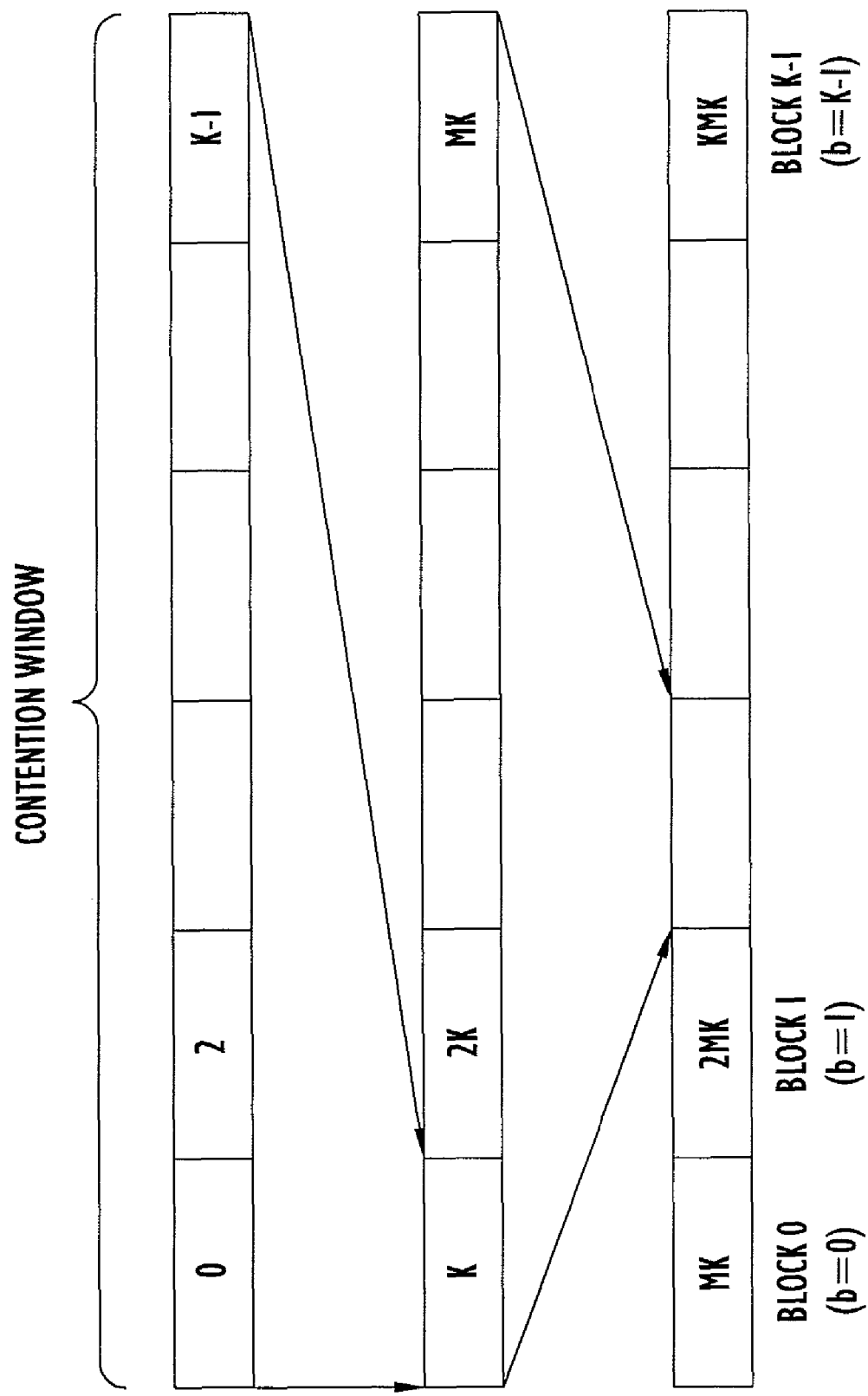
FIG. 2 is a diagram illustrating organization of time slots for the channel access processes according to the present invention.

According to the present invention, this problem is solved by reducing the probability of multiple nodes trying to access the channel at the same time. Turning to FIG. 2, time on the shared channel is divided into recurring periods each comprising K plurality of time slots, where K is the specified contention slot size. In other words, the contention window comprises K time slots. When a node needs to access the channel, it is assigned a slot at the beginning of every period of K time slots. When the channel access time is not aligned with the period of K slots, the assignment is made in the next boundary or period of K slots. A node can only contend for access to the channel at the beginning of a boundary of K slots. A sequence of K slot periods make up what is referred to herein as a block. For example, as shown in FIG. 2, a block of time slots comprises M plurality of K slot periods, wherein M is an integer. A block may be assigned an identifier b=0 to K−1 for K blocks as shown in FIG. 2.

Figure 3:
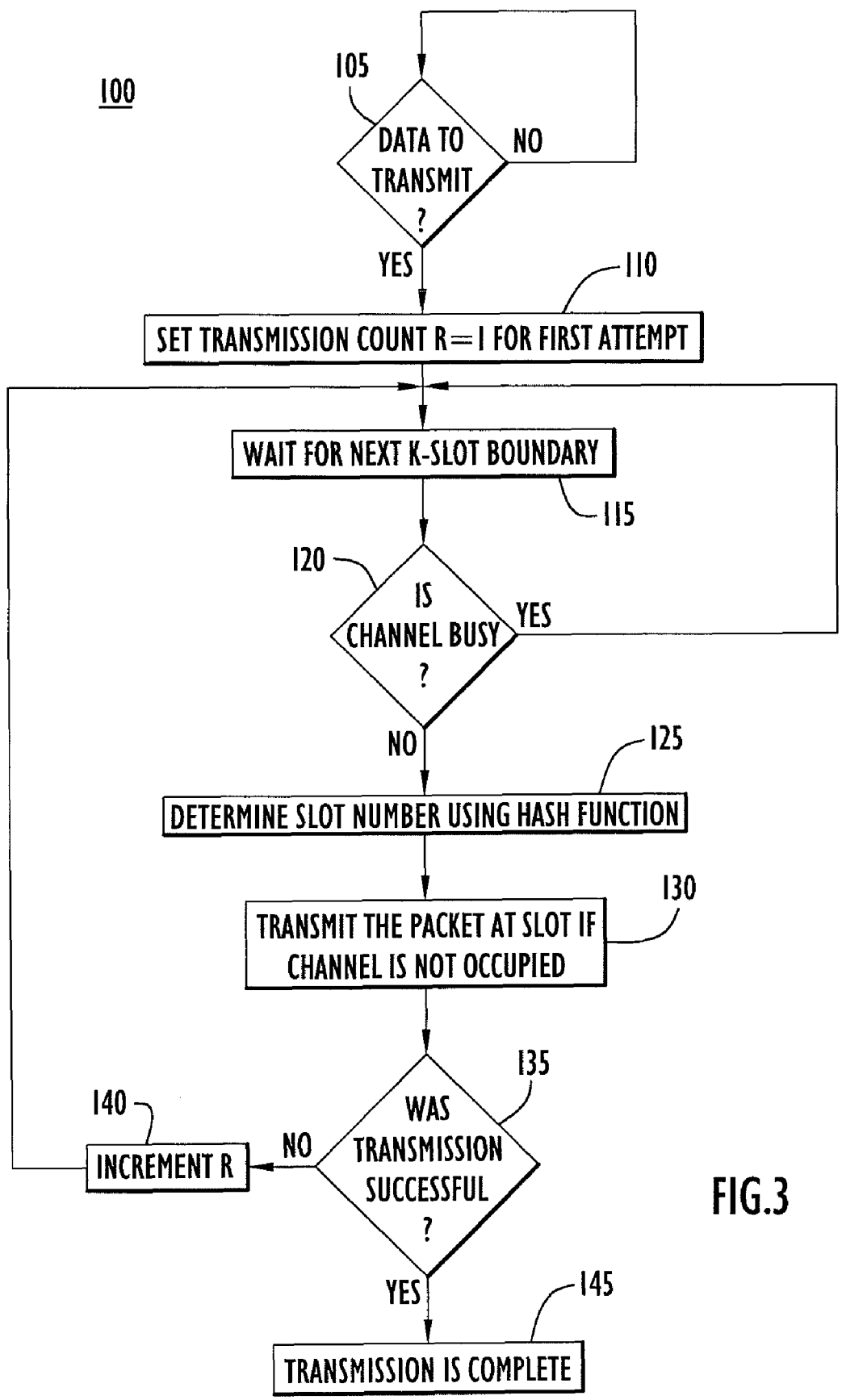
FIG. 3 is a flow chart depicting a channel access process according to a first embodiment of the present invention.

Turning to FIG. 3, a channel access control process according to a first embodiment is described. This channel access control process involves each node using the same predetermined rule to determine its time slot assignment. For example, each node uses the same simple hash function for computing its time slot assignments to access the channel. The number of slots available for assignments is limited and has a period of K slots. When a node has a packet to send, the node computes and determines its slot assignment at the beginning of a K-slot period.

There are several advantages to this scheme. First, the period K is limited so that the impact on throughput is minimal. Second, the nodes are assigned to different time slots for channel access without any transmission overhead because every node knows and uses the same hash function for computing its time slot assignment.

One example of a predetermined rule or computation that each node uses to determine its time slot assignment is a hash function. An example of a hash function is given by the following equation:

$$f(N, K, R) = N - \left[I\left(\frac{N}{K-R+1}\right)\right](K - R + 1) \qquad (1)$$

where N is a number identifier (node station ID) assigned to a node among a plurality of nodes, K is the contention window size in terms of time slots, R is the transmission count that indicates how many attempts a node has made to transmit data, and I( ) is an integer part of expression inside the bracket. The function $f$ in equation (1) represents the remainder of the station ID (N) divided by integer of (K−R+1) and the value of function $f$ is the time slot number (0 through K−1) that a node is assigned in order to contend for access to the channel.

The channel access control process 100 shown in FIG. 3 is now described. Channel access starts after net formation and neighbor discovery. At 105, when a node determines that it has a data packet to transmit to another node, it proceeds to 110 where it initializes the value of transmission count R to 1 for the first attempt to send the data. Next, at 115, the node waits for the beginning of the next K-slot contention window or period. Then, at the next K-slot boundary, the node determines whether the channel is free at 120. If the channel is determined not to be free due to signal activity detected on the channel, the process goes back to 115 and the node waits until the next K-slot boundary and again determines whether the channel is free. The loop between 115 and 120 continues until the node determines that the channel is free at the beginning of a K-slot contention window or period. When at 120 the node determines that the channel is free, then at 125 the node computes a time slot assignment using a predetermined rule, such as the value of the function f where in the first attempt to transmit the data the transmit count value R=1.

At 130, the node transmits the data packet if the channel is free at that time slot, and at 135 it determines whether the transmission was successful. For example, when a node makes a transmission according to a communication protocol, such as an IEEE 802.11 protocol, a communication session between two nodes follows the sequence of RTS, CTS, data message and ACK. A node trying to access the channel to transmit a packet first sends an RTS to the intended receiving node. If the channel access is successful the intended receiving node transmits a CTS message that the transmitting node receives. Therefore, the transmitting node knows whether the transmission to the intended receiving node is successful. If there is a failure, the transmitting node knows the plausible contending nodes from its neighbors table. When it is determined at 135 that the transmission was successful, then at 140 the node declares the transmission successful and the process ends.

On the other hand, when the node determines that the transmission was not successful, then the process goes to 145 where the node increments the transmit count value of R by one and goes to 115 to wait for the next K-slot contention window to make a second attempt to transmit the data using the same process as the first attempt, but with R=2. Changing the transmission count value R will cause the time slot computation at 125 to produce a different time slot than the one computed when R=1. That is, by incrementing the transmission count value R, the node will compute a different time slot during which to makes its transmission and the chance that other nodes will be contending for that same time slot is not as likely. The probability of collision is significantly reduced after the second attempt because the number of neighboring nodes assigned to the same slot for the first attempt is already a fraction of the total number of neighboring nodes.

The first transmission attempt may not be successful depending on which nodes are trying to access the channel. The process depicted between 115 and 135 repeats and after a few attempts any nodes contending for the same time slot as the node attempting the transmission would be assigned to different slots and the probability of collisions approaches zero. Specifically, the probability of collisions decreases for each successive try because the hash function depends upon the transmission count R, as well as the node ID, which is different for every node. Under most conditions, the transmissions are collisions free after a few tries.

When a node successfully grabs the channel, all the other contending nodes back off until the transmissions from the transmitting node are complete. When the transmission completes, the other nodes contend again following the same channel access rule by setting R=1 in the time slot computation function $f$.

The following is a detailed example of operation of the channel access control process 100. In this example, it is assumed that a fully connected network comprises 20 nodes with node station IDs from 1 to 20, respectively, and that the contention slot size is K=5. Assume also, node 2 and node 7 transmit at the same time. For the first transmission by each node (R=1) the time slot assignments are listed below in Table 1 using equation (1) above.

TABLE 1

Slot assignment for the first transmission attempt

| Assigned Time Slot | Nodes |
|---|---|
| 0 | 5, 10, 15, 20 |
| 1 | 1, 6, 11, 16 |
| 2 | 2, 7, 12 17 |
| 3 | 3, 8, 13, 18 |
| 4 | 4, 9, 14, 19 |

According to Table 1, nodes 5, 10, 15 and 20 are assigned to lot 0; nodes 1, 6, 11 and 16 are assigned to slot 1; nodes 2, 7, 12 and 17 are assigned to slot 2; nodes 3, 8, 13 and 18 are assigned to slot 3 and nodes 4, 9, 14 and 19 are assigned to slot 4. When two nodes intending to transmit compute the same time slot assignment, then collisions will occur. However, when two nodes intending to transmit compute different time slog assignments collisions are avoided. In this example, nodes 2 and 7 are both assigned to slot 2 for their first transmission and would therefore result in a collision. Assume for the sake of this example that node attempts its transmission at slot 2 but determines that its transmission fails (because of its collision with a transmission made by node 7 also at slot 2).

Since each node is programmed with the knowledge that the other nodes will be using the same time slot computation rule, then one node will know which of the other nodes are contending nodes for a time slot. For example, node 2 knows its possible contending nodes are nodes 7, 12 and 17 out of the possible 19 neighbors and node 7 knows that nodes 2, 12 and 17 are its possible contending nodes. To resolve the collisions in node 2's second transmission attempt, the transmission count value R is incremented so that R=2. The time slot assignments when R=2 are given by Table 2 below.

TABLE 2

Slot assignment for the second transmission attempt

| Assigned Time Slot | Nodes |
|---|---|
| 0 | 12 |
| 1 | 17 |
| 2 | 2 |
| 3 | 7 |

According to the above table, when R=2 node 2 is assigned to slot 2 while node 7 is assigned to slot 3. Therefore, the transmissions of nodes 2 and 7 are collision free. When node 2 makes its transmission at slot 2, node 7 will hear the RTS from node 2 and will back off until node 2 finishes its transmission. Thereafter, node 7 may contend again to transmit its data. If node 7 is attempting a new transmission, then node 7 will set R=1 to compute its time slot assignment. On the other hand, if node 7 is making a second attempt at a transmission, then node 7 will set R=2 when computing its time slot assignment.

According to a further embodiment of the present invention, the channel access control scheme shown in FIG. 3 may be enhanced in order to achieve fairness in terms of channel assignment and collision probability. Fairness becomes important since each node uses the same hash function and consequently certain nodes may always have the priority to access the channel. Those nodes assigned to slot 0 always have priority over the others to get access to the channel for a particular K-slot contention window. In the previous example, nodes 5, 10, 15 and 20 always grab the channel first even when other nodes may be contending.

To solve this problem, the notion of fairness is introduced by providing a round-robin time slot assignment scheme that allows for every node to have the highest probability to access the channel. Said another way, a round-robin time slot assignment approach is provided to ensure that no node has higher priority than other nodes in accessing the channel.

Referring back to FIG. 2, time on the channel is divided into a sequence of successive blocks of time slots in which each block comprises M*K time slots, where M is an integer. In other words, time is divided into a period of $M*K^2$ slots. Each block comprises M*K slots. A node wishing to transmit determines its slot group, s, using the hash function given in equation (1). The node then determines the time for transmission by finding first the specific slot block (comprising M*K slots), b, within the $M*K^2$ slot periods. The slot used for transmission is, then, given by the following equation $$S_i = [(K-R+1)-b+s] \text{modulo} (K-R+1) \quad (2)$$

The above is a general equation and applies to transmissions as well as retransmissions.

Figure 4:
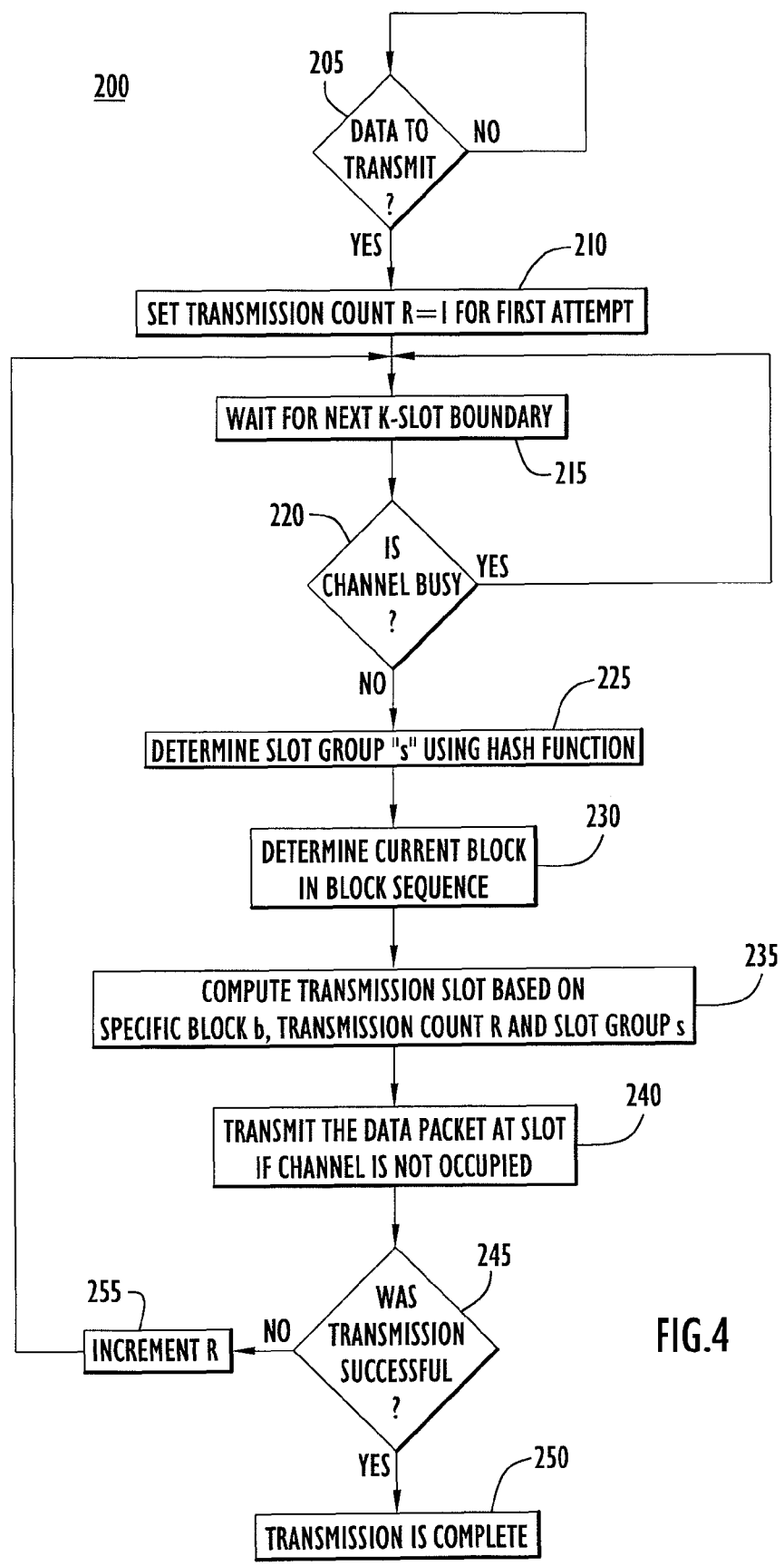
FIG. 4 is a flow chart depicting a channel access with fairness process according to a second embodiment of the present invention.

Reference is now made to FIG. 4 for a more detailed description of the rotating slot assignment enhancement to the channel access scheme according to the present invention. At 205, when a node determines it has data to transmit, it proceeds to 210 where the transmit count value R is initialized by setting it equal to 1 for the first transmission attempt. At 215, the node waits for the next K-slot contention window boundary. At the next K-slot boundary the node determines whether the channel is busy at 220. If the channel is determined to be busy, then the process goes back to 215 where the node waits until the next K-slot boundary. Otherwise, once the node determines at 220 that the channel is not busy at the beginning of a K-slot boundary, at 225 the node determines its slot group, s, using the hash function of equation (1). Then, at 230, the node determines the current block in the block sequence (Block 0 to Block K−1), and the variable b is set equal to that block identifier Next, at 235, using a computation according to equation (2), the node computes its transmission slot based on the block b determined at 230, transmission count R and slot group s. Once the particular transmission slot is computed, the node attempts the transmission at 240. If the channel is busy at the time of its transmission slot $S_t$, the node waits until the end of transmission before contending again If it is determined to be busy, then the node contends again at the next K-slot boundary. Every node is assigned to one of the K slots, but can contend only at the beginning of the K-slot boundary. In any event, this process continues until the channel is free.

Once the node grabs the channel at its computed time slot, it transmits the data packet at 240 and determines at 245 whether the transmission was successful. If the transmission is successful, the node has completed its transmission. If the transmission is not successful, the node increments the transmission count value R by 1 at 255 for use in the computation of equation (1) of s at the next K-slot boundary. After that, the procedure repeats from 215 as described above.

Once a node grabs the channel at its time slot $S_t$, the transmission procedure may follow the standard CSMA technique such as in the IEEE 802.11 communication protocol. The node first sends an RTS to the intended recipient node and then waits for a CTS message from the intended recipient node. Once the transmitting node receives the CTS message, it sends the data packet. If the destination node receives the data packet, it responds by transmitting an ACK to the transmitting node, thereby giving acknowledgement to the transmitting node that the transmission is completed.

The concept of a slot group, s, is described in further detail. The result of the computation of equation (1) is a particular time slot from 0 to K−1. As shown in Table 1 above, there are multiple nodes assigned to the same time slot. The nodes which are assigned to the same slot for contention form a slot group, where the value of s for all the nodes in a slot group is either 0, 1, 2, ..., or K−1. That is, group 1 (s=0) comprises all the nodes that are assigned to slot 0 by virtue of equation (1), group 2 (s=1) comprises all the nodes that are assigned to slot 1, ..., and group K (s=K−1) comprises all the nodes assigned to slot K−1. Within every block of (M*K) slots, all the nodes follow the same rule to determine the slot for access the channel, but group assignments rotate from one block of (M*K) slots to the next block of (M*K) slots. Also, all the nodes contend at the beginning of every K-slot period. More specifically, within the first block of (M*K) slots (Block 0, b=0) all the nodes follow a first group assignment/rotation sequence (called assignment sequence 1) comprises the sequence: group 1, group 2, ..., group K. Thus, for all K-slot periods during Block 0, nodes in group 1 are assigned to slot 0, nodes in group 2 are assigned to slot 1 and so on, and nodes in group K are assigned to slot K−1.

Within the second block of (M*K) slots (Block 1, b=1), all the nodes follow a second group assignment/rotation sequence (called assignment sequence 2) comprising the sequence: group 2, group 3, ..., group K and, then group 1. Thus, for all K-slot periods during Block 1, nodes in group 2 are assigned to slot 0, nodes in group 3 are assigned to slot 1, ..., nodes in group K are assigned to slot K−2, and nodes in group 1 are assigned to slot K−1. This assignment rotation sequence continues and within the last block of (M*K) slots (Block K−1, b=K−1), all the nodes follow a K group assignment/rotation sequence comprising the sequence: group K, group 1, group 2, ..., group K−1. This is summarized in the Table 3 below.

TABLE 3

Group assignment/rotation sequence versus time

| Blocks (b) | Time in slots | Group assignment sequence |
|---|---|---|
| 0 | MK | 1, 2, 3, - - - K − 1, K |
| 1 | 2MK | 2, 3, 4 - - - K − 1, K, 1 |
| 2 | 3MK | 3, 4, 5 - - - K − 1, K, 1, 2 |
| | | - - - |
| K − 1 | KMK | K, 1, 2, - - - K − 2, K − 1 |

Thus, when a node is determining which of the K time slots it may use to access the communication channel, it obeys a group assignment sequence that changes from one block of time slots to the next block of time slots. In particular, the group assignment sequence rotates one slot group from one block to the next block and repeats after M blocks of time slots.

A description of the scheme depicted in Table 3 above is as follows:

After a node has determined which slot group is belongs to using equation (1) and values for node identifier N, number K of slots and transmission count value R, a node determines which of the K time slots the node may access the channel according to the group assignment sequence. During a first block of time slots: nodes in a first slot group are assigned to a first time slot during the contention window periods, nodes in a second slot group are assigned to a second time slot during the contention window periods, and so on, and such that the nodes in the Kth slot group are assigned to the Kth slot during the contention window periods. During a second block of time slots: nodes in the second slot group are assigned to the first time slot during the contention window periods, nodes in a third slot group are assigned to the second time slot during the contention window periods, and so on, and such that nodes in the last slot group are assigned to a next to last time slot during the contention window periods and nodes in the first slot group are assigned to the last time slot during the contention window periods; and so on. During a last block of time slots: nodes in the last slot group are assigned to the first time slot during contention window periods, nodes in the first slot group are assigned to the second time slot during contention window periods, and so on, and such that nodes in a next to last slot group are assigned to the last time slot during contention window periods.

For retransmissions, the group assignments remain the same as within the same MK slots for the first transmission.

The fairness approach can be illustrated using the same example as the one given above in where K=5. The group assignment for the first transmission is given in Table 4 below, which is identical to the time slot assignments in Table 1.

TABLE 4

Group assignment for the first transmission

| Group (s) | Nodes |
|---|---|
| 1 | 5, 10, 15, 20 |
| 2 | 1, 6, 11, 16 |
| 3 | 2, 7, 12, 17 |
| 4 | 3, 8, 13, 18 |
| 5 | 4, 9, 14, 19 |

In this example, it is assumed that M=20. The group rotation sequence is given below in Table 5:

TABLE 5

Group rotation sequence for the first transmission

| Block (b) | Time in slots | Group rotation sequence |
|---|---|---|
| 0 | 0-99 | 1, 2, 3, 4, 5 |
| 1 | 100-199 | 2, 3, 4, 5, 1 |
| 2 | 200-299 | 3, 4, 5, 1, 2 |
| 3 | 300-399 | 4, 5, 1, 2, 3 |
| 4 | 400-499 | 5, 1, 2, 3, 4 |

In this example, every sequence lasts M*K=100 slots and the period of the rotation sequence is KMK=20*25=500 slots. Thus, the rotation sequence repeats after K blocks of time slots. Within every 100 slots, the same group assignment sequence is maintained for each K-slot period, but the sequence changes during the next block of 100 slots. The period of the rotation sequence can be adjusted by changing the parameter M.

Figure 5:
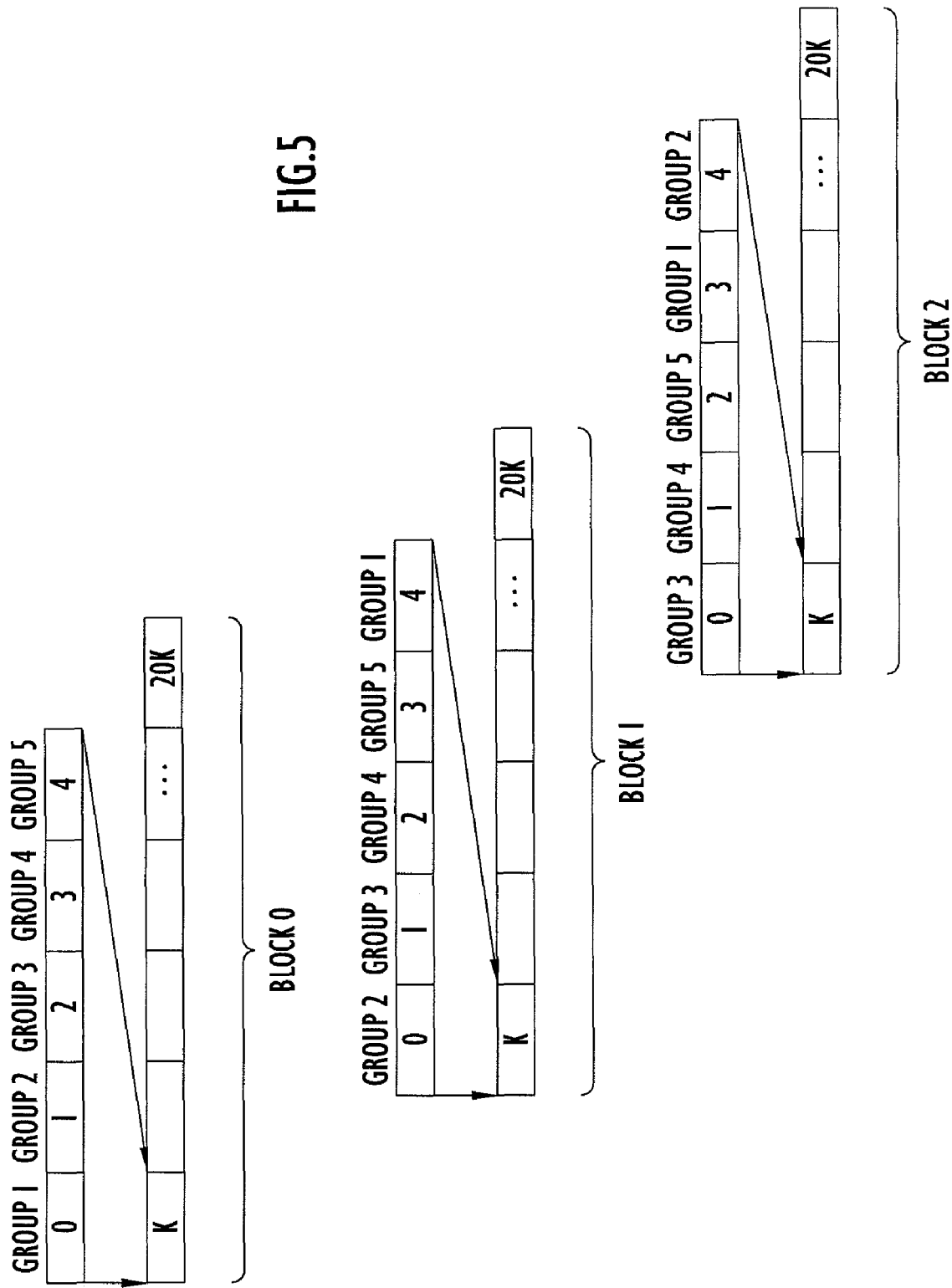
FIG. 5 is a timing diagram depicting the fairness process shown in FIG. 4 according to an embodiment of the present invention.

Operation of the rotation scheme is now explained in more detail with reference to FIG. 5. During the first block, Block 0 (b=0), the group assignment sequence is 1, 2, 3, 4, 5. This means in every period of 5 slots during Block 0, nodes 5, 10, 15 and 20 are assigned to slot 0, nodes 1, 6, 11 and 16 are assigned to slot 1, nodes 2, 7, 12 and 17 are assigned to slot 2, nodes 3, 8, 13 and 18 are assigned to slot 3 and nodes 4, 9, 14 and 19 are assigned slot 4.

In Block 1, the assignment sequence rotates to 2, 3, 4, 5, 1. This means in every period of 5 slots during Block 1, nodes 1, 6, 11 and 16 are assigned to slot 0, nodes 2, 7, 12 and 17 are assigned to slot 1, nodes 3, 8, 13 and 18 are assigned to slot 2, nodes 4, 9, 14 and 19 are assigned slot 3 and nodes 5, 10, 15 and 20 are assigned to slot 4.

Further, in Block 2, the assignment sequence rotates to 3, 4, 5, 1, 2. This means in every period of 5 slots during Block 2, nodes 2, 7, 12, 17 are assigned to slot 0, nodes 3, 8, 13, 18 are assigned to slot 1, nodes 4, 9, 14, 19 are assigned to slot 2, nodes 5, 10, 15, 20 are assigned to slot 3 and nodes 1, 6, 11 and 16 are assigned to slot 4. For Block 3, the process rotates to the group sequence 4, 5, 1, 2, 3. For Block 4, the process rotates to the group sequence 5, 4, 1, 2, 3 and then the rotation goes back to the group sequence 1, 2, 3, 4, 5 for Block 0.

In the second transmission, the number of groups is reduced by 1. If M and K are unchanged, there is a slight unfairness. This can also be illustrated by an example. Suppose the contending slots are 2, 7, 12, and 17. For the second transmission, the group assignment is given in Table 6 below.

TABLE 6

Group assignment for the second transmission

| Group | Nodes |
|---|---|
| 1 | 12 |
| 2 | 17 |
| 3 | 2 |
| 4 | 7 |

The group rotation sequence is given in Table 7 below.

TABLE 7

Group rotation sequence for the second transmission

| Time in slots | Group rotation sequence |
|---|---|
| 0-99 | 1, 2, 3, 4 |
| 100-199 | 2, 3, 4, 1 |
| 200-299 | 3, 4, 1, 2 |
| 300-399 | 4, 1, 2, 3 |
| 400-499 | 1, 2, 3, 4 |

Note that for the second transmission, the period is still 500 slots. However, there is a slight unfairness because the group sequence 1, 2, 3, 4 is utilized 40% of the time while the other sequences are utilized 20% of the time. This indicates that there is a tradeoff between time maintenance and slight unfairness.

Figure 6:
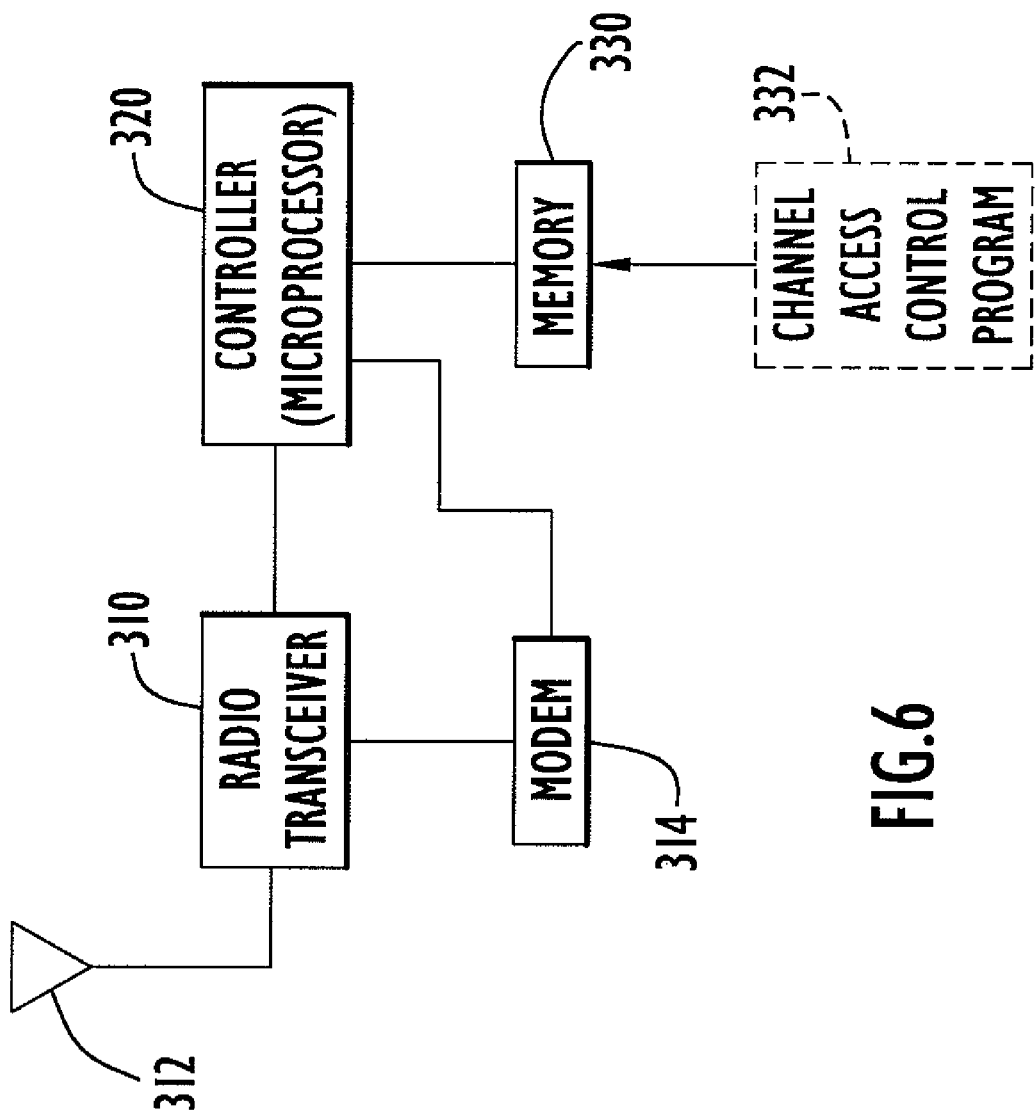
FIG. 6 is a block diagram of a wireless communication device that performs the channel access techniques according to the embodiments of the present invention.

FIG. 6 illustrates a wireless communication device 300 that may serve as any of the nodes shown in the network 10 of FIG. 1. The communication device 300 comprises a radio transceiver 310, a modem 314, a controller 320 and a memory 330. The radio transceiver 310 transmits and receives signals via an antenna 12 and the modem performs baseband signal processing (modulation and demodulation) of the transmit and receive signals. The controller 320 may be embodied by a microprocessor or other programmable processing device that executes a program stored in memory 330 for controlling operation of the communication device 300. For example, a channel access control program 332 may be stored in the memory 330 such that when the controller 320 executes the channel access control program 332, it performs the processes described above in connection with FIGS. 2-5. Alternatively, the controller 320 may be an application specific integrated circuit that is designed with logic to execute the functions of the channel access control program 332.

The system and methods described herein may be embodied in other specific forms without departing from the spirit or essential characteristics thereof. The foregoing embodiments are therefore to be considered in all respects illustrative and not meant to be limiting.

What is claimed is:

1. A method for controlling access of each of a plurality of nodes to a communication channel based on time slots such that the plurality of nodes contend for access during a contention window period comprised of K plurality of time slots, comprising: each node determining which one of the K plurality of time slots the node is assigned using a computation that is based on a number identifier N assigned to the node among the plurality of nodes, the number K of time slots, and a transmission count value R representing a number of attempts the node has made to transmit the data, wherein each node determines which of the K plurality of time slots it is assigned to by computing a value of a hash function $$f(N, K, R) = N - \left[ I\left(\frac{N}{K - R + 1}\right)\right](K - R + 1),$$

where I( ) is an integer function, and where the value of $f(N, K, R)$ is the time slot for the node.

2. The method of claim 1, wherein said determining is performed at a beginning of a sequence of K time slots, and after determining whether the communication channel is free.

3. The method of claim 1, and further comprising transmitting data during said one of the plurality of time slots, determining whether the transmission is successful and incrementing the transmission count value R when it is determined that the transmission was not successful and repeating said determining at a next sequence of K time slots.

4. The method of claim 1, and further comprising determining during which of the K time slots the node has access to the channel during each contention time period in a sequence of contention time periods during a block of time slots, each block comprising M*K time slots, where M is an integer, according to a group assignment sequence that changes from one block of time slots to the next block of time slots, wherein a plurality of slot groups are defined such that each slot group comprises those nodes which are assigned to the same time slot according to said computation.

5. A method for controlling access of each of a plurality of nodes to a communication channel based on time slots such that the plurality of nodes contend for access during a contention window period comprised of K plurality of time slots, comprising:

each node determining which one of the K plurality of time slots the node is assigned to using a computation that is based on a number identifier N assigned to the node among the plurality of nodes, the number K of time slots, and a transmission count value R representing a number of attempts the node has made to transmit the data;

determining during which of the K time slots the node has access to the channel during each contention time period in a sequence of contention time periods during a block of time slots, each block comprising M*K time slots, where M is an integer, according to a group assignment sequence that changes from one block of time slots to the next block of time slots, wherein a plurality of slot groups are defined such that each slot group comprises those nodes which are assigned to the same time slot according to said computation, wherein the group assignment sequence rotates one slot group from one block of time slots to the next block of time slots and repeats after K blocks of time slots such that within every block of (M*K) slots, all nodes follow the same rule to determine the slot for access the channel, but group assignments rotate from one block of (M*K) slots to the next block of (M*K) slots.

6. The method of claim 5, wherein determining comprises determining during which of the K time slots the node may access the channel according to the group assignment sequence in which:

i. during a first block of time slots: nodes in a first slot group are assigned to a first time slot during the contention window periods, nodes in a second slot group are assigned to a second time slot during the contention window periods, and so on, and such that the nodes in the Kth slot group are assigned to the Kth slot during the contention window periods;

ii. during a second block of time slots: nodes in the second slot group are assigned to the first time slot during the contention window periods, nodes in a third slot group are assigned to the second time slot during the contention window periods, and so on, and such that nodes in the last slot group are assigned to a next to last time slot during the contention window periods and nodes in the first slot group are assigned to the last time slot during the contention window periods;

iii. and so on, such that during a last block of time slots: nodes in the last slot group are assigned to the first time slot during contention window periods, nodes in the first slot group are assigned to the second time slot during contention window periods, and so on, and such that nodes in a next to last slot group are assigned to the last time slot during contention window periods.

7. A method for controlling access of each of a plurality of nodes to a communication channel over a period of time that is divided into a sequence of successive blocks of time slots, each block comprising a sequence of contention time periods comprising K time slots, where K is an integer, the method comprising:

each node determining which one of K slot groups the node is assigned to using a computation based directly on (a) a number identifier N assigned to the node among the plurality of nodes, (b) the number K, and (c) a transmission count value R that represents how many attempts the node has made to transmit the data, wherein each node determining which of the K plurality of time slots comprises computing a value of a hash function $$f(N, K, R) = N - \left[I\left(\frac{N}{K-R+1}\right)\right](K-R+1).$$

where I( ) is an integer function, and where the value of $f(N, K, R)$ is the time slot for the node, such that nodes in each slot group access the channel at a corresponding one of the K time slots; and determining during which of the K time slots the node is to access the channel during each contention time period in the sequence of contention time periods during a block of time slots, each block comprising M*K time slots, where M is an integer, according to a group assignment sequence that changes from one block of time slots to the next block of time slots, wherein a plurality of slot groups are defined such that each slot group comprises those nodes which are assigned to the same time slot according to said computation.

8. The method of claim 7, wherein determining during which of the K time slots the node is to access the channel comprises computing the time slot $S_r=[(K-R+1)-b+s]$ modulo(K-R+1), wherein b is a number for the particular block of time slots during which the node is seeking access to the channel, s is the slot group from 0 to K−1 for the node.

9. The method of claim 7, and further comprising at the time slot for which a node is determined to access the channel, determining whether the channel is busy and if so waiting until the next contention window period.

10. The method of claim 7, and further comprising transmitting data during the time slot for which a node is determined to access the channel, determining whether the transmission is successful, and incrementing the transmission count value R by 1 and repeating said determining which one of K slot groups a node is assigned and said determining during which of the K time slots the node is to access the channel.

11. A method for controlling access of each of a plurality of nodes to a communication channel over a period of time that is divided into a sequence of successive blocks of time slots, each block comprising a sequence of contention time periods comprising K time slots, where K is an integer, the method comprising:

each node determining which one of K slot groups the node is assigned to using a computation based directly on (a) a number identifier N assigned to the node among the plurality of nodes, (b) the number K, and (c) a transmission count value R that represents how many attempts the node has made to transmit the data, such that nodes in each slot group access the channel at a corresponding one of the K time slots; and determining during which of the K time slots the node is to access the channel during each contention time period in the sequence of contention time periods during a block of time slots, each block comprising M*K time slots, where M is an integer, according to a group assignment sequence that changes from one block of time slots to the next block of time slots, wherein a plurality of slot groups are defined such that each slot group comprises those nodes which are assigned to the same time slot, wherein the group assignment sequence rotates one slot group from one block of time slots to the next block of time slots and repeats after K blocks of time slots such that within every block of (M*K) slots, all nodes follow the same rule to determine the slot for access the channel, but group assignments rotate from one block of (M*K) slots to the next block of (M*K) slots.

12. The method of claim 11, wherein determining comprises determining during which of the K time slots the node is to access the channel according to the group assignment sequence such that:

i. during a first block of time slots nodes in a first slot group are assigned to a first time slot during the contention window periods, nodes in a second slot group are assigned to a second time slot during the contention window periods, and so on, and such that the nodes in the Kth slot group are assigned to the Kth slot during the contention window periods;

ii. during a second block of time slots: nodes in the second slot group are assigned to the first time slot during the contention window periods, nodes in a third slot group are assigned to the second time slot during the contention window periods, and so on, and such that nodes in the last slot group are assigned to a next to last time slot during the contention window periods and nodes in the first slot group are assigned to the last time slot during the contention window periods;

iii. and so on, such that during a last block of time slots: nodes in the last slot group are assigned to the first time slot during contention window periods, nodes in the first slot group are assigned to the second time slot during contention window periods, and so on, and such that nodes in a next to last slot group are assigned to the last time slot during contention window periods.

13. A wireless communication device for operation in a wireless ad hoc data network, comprising:

a radio transceiver;
a modem; and
a controller connected to the modem and radio transceiver, wherein the controller is configured to control access of the wireless communication device to a communication channel during a contention window period comprised of K plurality of time slots by determining which of the K plurality of time slots the wireless communication device is assigned based on a number identifier N assigned to the wireless communication device among a plurality of other wireless communication devices operating in the network, the number K of time slots, and a transmission count value R representing a number of attempts the wireless communication device has made to transmit the data, by computing a value of a hash function $$f(N, K, R) = N - \left[ I\left(\frac{N}{K-R+1}\right) \right](K-R+1),$$

where I( ) is an integer function, and the value of ƒ(N, K, R) is the time slot for the wireless communication device.

14. The wireless communication device of claim 13, wherein the controller is configured to determine whether the transmission from the wireless communication device is successful, and to increment the transmission count value R when the transmission is determined not to be successful.

15. The wireless communication device of claim 13, wherein the controller is configured to determine the time slot for the wireless communication device using the same mathematical computation that is used by each of a plurality of other wireless communication devices operating in the network.

16. The wireless communication device of claim 13, wherein the controller is configured to determine during which of the K time slots the wireless communication device may access the channel during each contention time period in a sequence of contention time periods during a block of time slots, each block comprising M*K time slots, where M is an integer, according to a group assignment sequence that changes from one block of time slots to the next block of time slots, wherein a plurality of slot groups are defined such that each slot group comprises those wireless communication devices in the network which are assigned to the same time slot.

17. The wireless communication device of claim 16, wherein the controller is configured to determine during which of the K time slots the wireless communication device has access to access the channel based on the group assignment sequence that rotates one slot group from one block of time slots to the next block of time slots and repeats after K blocks of time slots such that within every block of (M*K) slots, the wireless communication device follows the same rule as other wireless communication devices seeking access to the channel in the network to determine the slot for access the channel, but group assignments rotate from one block of (M*K) slots to the next block of (M*K) slots.

18. The wireless communication device of claim 16, wherein the controller is configured to determine which of the K time slots the node may access the channel according to the group assignment sequence such that:

i. during a first block of time slots: wireless communication devices in a first slot group are assigned to a first time slot during the contention window periods, wireless communication devices in a second slot group are assigned to a second time slot during the contention window periods, and so on, and such that the wireless communication devices in the Kth slot group are assigned to the Kth slot during the contention window periods;

ii. during a second block of time slots: wireless communication devices in the second slot group are assigned to the first time slot during the contention window periods, wireless communication devices in a third slot group are assigned to the second time slot during the contention window periods, and so on, and such that wireless communication devices in the last slot group are assigned to a next to last time slot during the contention window periods and nodes in the first slot group are assigned to the last time slot during the contention window periods;

iii. and so on, such that during a last block of time slots: wireless communication devices in the last slot group are assigned to the first time slot during contention window periods, wireless communication devices in the first slot group are assigned to the second time slot during contention window periods, and so on, and such that wireless communication devices in a next to last slot group are assigned to the last time slot during contention window periods.

19. A wireless communication device for operation in a wireless ad hoc data network, comprising:
a radio transceiver;
a modem; and
a controller connected to the modem and radio transceiver, wherein the controller is configured to control access of the wireless communication device to a communication channel over a period of time that is divided into a sequence of successive blocks of time slots, each block comprising a sequence of contention time periods comprising of K time slots, where K is an integer, the controller being configured to determine which one of K slot groups a wireless communication device is assigned to based on a number identifier N assigned to the wireless communication device among the plurality of wireless communication devices operating in the wireless ad hoc data network, the number K, and a transmission count value R that indicates how many attempts the wireless communication device has made to transmit the data, such that wireless communication devices in each slot group access the channel at a corresponding one of the K time slots, and configured to determine during which of the K time slots the wireless communication device is to access the channel during each contention time period in the sequence of contention time periods during a block of time slots, each block comprising M*K time slots, where M is an integer, according to group assignment sequence that changes from one block of time slots to the next block of time slots, wherein the controller is configured to determined which of the K time slots the wireless communication device may access the channel based on the group assignment sequence that rotates one slot group from one block of time slots to the next block of time slots and repeats after K blocks of time slots, where K is an integer, such that within every block of (M*K) slots, the wireless communication device follows the same rule as all other wireless communication devices seeking access to the channel in the network to determine the slot for access the channel, but group assignments rotate from one block of (M*K) slots to the next block of (M*K) slots.

20. The wireless communication device of claim 19, wherein the controller is configured to determine-which of the K time slots the wireless communication device is to access the channel according to the group assignment sequence in which during a first block of time slots such that: wireless communication devices in a first slot group are assigned to a first time slot during the contention window periods, wireless communication devices in a second slot group are assigned to a second time slot during the contention window periods, and so on, and such that the wireless communication devices in the Kth slot group are assigned to the Kth slot during the contention window periods; during a second block of time slots: wireless communication devices in the second slot group are assigned to the first time slot during the contention window periods, wireless communication devices in a third slot group are assigned to the second time slot during the contention window periods, and so on, and such that wireless communication devices in the last slot group are assigned to a next to last time slot during the contention window periods and wireless communication devices in the first slot group are assigned to the last time slot during the contention window periods; and so on, such that during a last block of time slots: wireless communication devices in the last slot group are assigned to the first time slot during contention window periods, wireless communication devices in the first slot group are assigned to the second time slot during contention window periods, and so on, and such that wireless communication devices in a next to last slot group are assigned to the last time slot during contention window periods.

* * * * *